Patented Feb. 16, 1943

2,311,098

UNITED STATES PATENT OFFICE 2,311,098

PHOTOGRAPHIC FILM COMPRISING NITRO-CELLULOSE FILM BASE STABILIZED BY A DIHYDRAZIDE OF AN ALIPHATIC DICARBOXYLIC ACID

Donald R. Swan and John M. Calhoun, Rochester, N. Y., assignors to Eastman Kodak Company, Rochester, N. Y., a corporation of New Jersey No Drawing. Application November 13, 1941, Serial No. 419,026

13 Claims. (Cl. 95—9)

This invention relates to photographic film and more particularly to photographic film of the high-speed type. More particularly, it relates to the stabilization of nitrocellulose film base for this type of film.

For many years, nitrocellulose has served satisfactorily as a film base with the older, slower types of photographic emulsions. Nitrocellulose, however, decomposes slightly on long storage, particularly at high temperatures, and its decomposition products have been found to decrease the speed of modern high-speed photographic emulsions coated on nitrocellulose film base. This is true even though the film base be coated on both surfaces with thin layers of other materials, before the application of the emulsion, so that the emulsion never comes in direct contact with the nitrocellulose. In order to maintain the optimum keeping qualities of these high-speed emulsions, it has, therefore, been necessary to use cellulose acetate film base with them. However, as nitrocellulose film base has certain very desirable physical properties, it would be an advantage if it could be used for films carrying high-speed emulsions.

An object of this invention is to stabilize nitrocellulose so that it can be used in film base to which high-speed photographic emulsions are applied. Other objects include the stabilization of nitrocellulose for other uses.

While certain stabilizers for nitrocellulose have been known, such as urea and diphenylamine, they are not satisfactory for use in high-speed films. Diphenylamine, for instance, which is widely used in smokeless powder, gives a dark greenish brown color to the film base, and hence is entirely unsuitable for use in a film base which must be transparent and practically colorless. Urea, while it stabilizes the nitrocellulose to some extent, does not decrease the loss of emulsion speed when the film is stored. Many other compounds have been tried in the course of our investigation, but most of them either failed to stabilize the nitrocellulose, or imparted color to the film base, or fogged or desensitized the emulsion during storage:

We have found a class of compounds which, when present in small quantities in nitrocellulose film base, not only do not materially affect the color of the film base, but stabilize the nitrocellulose, do not fog high-speed photographic emulsions, and materially decrease the loss of speed of high-speed photographic emulsions coated on the film base, as compared to the loss of speed of the same emulsions coated on nitrocellulose film base not containing the stabilizer. This class of compounds consists of the dihydrazides of aliphatic dicarboxylic acids, of which the following are mentioned by way of example:

Oxalic dihydrazide $NH_2.NH.CO.CO.NH.NH_2$
Malonic dihydrazide
  $NH_2.NH.CO.CH_2.CO.NH.NH_2$
Succinic dihydrazide
  $NH_2.NH.CO(CH_2)_2.CO.NH.NH_2$
Glutaric dihydrazide
  $NH_2.NH.CO(CH_2)_3.CO.NH.NH_2$
Adipic dihydrazide
  $NH_2.NH.CO(CH_2)_4.CO.NH.NH_2$
Pimelic dihydrazide
  $NH_2.NH.CO.(CH_2)_5.CO.NH.NH_2$
Suberic dihydrazide
  $NH_2.NH.CO(CH_2)_6.CO.NH.NH_2$
Azelaic dihydrazide
  $NH_2.NH.CO(CH_2)_7.CO.NH.NH_2$
Sebacic dihydrazide
  $NH_2.NH.CO(CH_2)_8.CO.NH.NH_2$
Lauryl malonic dihydrazide
  $CH_3.(CH_2)_{11}.CH.(CO.NH.NH_2)_2$
Tartaric dihydrazide
  $NH_2.NH.CO.(CHOH)_2.CO.NH.NH_2$
Diglycollic dihydrazide
  $NH_2.NH.CO.CH_2.O.CH_2.CO.NH.NH_2$
Thiodiglycollic dihydrazide
  $NH_2.NH.CO.CH_2.S.CH_2.CO.NH.NH_2$
Diaminobiuret
  $NH_2.NH.CO.NH.CO.NH.NH_2$ The dihydrazides of the aliphatic dicarboxylic acids may be prepared by treating a methanol solution of the dimethyl ester of the acid with hydrazine hydrate. For example, adipic acid dihydrazide may be prepared as follows:

3000 grams of dimethyl adipate is mixed with 1½ times its volume of methanol, and the resulting solution is added to 2500 grams of 85% hydrazine hydrate. Heat is evolved, and in a short time white leaflets of adipic acid dihydrazide begin to form. After about 24 hours, the crystals are filtered off and well washed with methanol. The product may be further purified by forming a saturated solution in boiling water, decolorizing with carbon, filtering and allowing to cool. Before crystallization begins, it is customary to add an equal volume of methanol to dilute the crystal mass and thus make subsequent filtering easier. After the crystals are filtered off, they can be satisfactorily dried at 55° C.

In carrying out our invention, the nitrocellulose film base may be prepared in the conventional manner, by depositing a solution of film-type nitrocellulose and plasticizer, in a volatile solvent, on a smooth surface and removing the volatile solvent, or in any other manner known to the art. Nitrocellulose compositions for other purposes may be prepared in a similar manner, or by working the nitrocellulose with plasticizer on rolls, or in any other known manner. Our novel stabilizers may be added to the nitrocellulose composition in amounts of from 0.0001 mole to 0.01 mole per 100 gms. of nitrocellulose. We prefer to use from 0.0005 mole to 0.005 mole of stabilizer per 100 gms. of nitrocellulose. Expressed in % by weight of the nitrocellulose, we may use 0.01–1.0% of oxalic dihydrazide, 0.015–1.5% of succinic dihydrazide, or 0.02–2.0% of adipic dihydrazide, our preferred ranges for these three stabilizers being 0.05–0.5% of oxalic dihydrazide, 0.075–0.75% of succinic dihydrazide, or 0.10–1.0% of adipic dihydrazide. More than 0.01 mole may be added in some cases, if the stabilization is improved thereby, provided that the physical properties of the film base are not adversely affected.

The dihydrazides of aliphatic dicarboxylic acids may be used either as such or in the form of their hydrazones. If acetone is present in the nitrocellulose solution, as it usually is, some hydrazone will be formed. However, we have found that either the dihydrazides or their hydrazones are effective as nitrocellulose stabilizers when no acetone or other ketone is or has been present in the solution.

Continued circulation of nitrocellulose solutions containing our novel stabilizers, in the film-base manufacturing system, may result in increased corrosion of the metal equipment as compared to the corrosion brought about by the same nitrocellulose solution without the stabilizer. This may be overcome by the addition of a suitable corrosion inhibitor to the solution. We have found that urea, for instance in amounts of 0.1–1.0% of the weight of the nitrocellulose, is a satisfactory corrosion inhibitor for these solutions. Other corrosion inhibitors which may be used include diamyl hydroquinone, thymol, carvacrol, and p-tertiary amyl phenol.

The nitrocellulose film base containing our novel stabilizers may be coated with any of the known "sub" coatings and/or backings which will adhere to nitrocellulose, e. g., coatings or backings of cellulose esters, proteins or resins, before the application of the sensitive emulsion.

Our novel stabilizers decrease the deleterious effect of nitrocellulose on any of the highly sensitive, high-speed photographic negative emulsions, such, for instance as the emulsions used in high-speed ciné-negative film, "Plus X" film, and "Super XX" film. The composition of these emulsions is not a part of our invention. Our novel stabilizers inhibit the decomposition of the nitrocellulose, and thus prevent to a great extent the unfavorable action of nitrocellulose decomposition products on the highly sensitive emulsions. Not only is the unexposed emulsion thus preserved, but the latent image keeping property is improved: i. e., the film does not deteriorate so rapidly between exposure and development.

What we claim as our invention and desire to be secured by Letters Patent of the United States is:

1. A photographic sensitive element comprising a photographic emulsion which would normally be deleteriously affected by continued proximity to nitrocellulose film base, and nitrocellulose film base comprising, as a stabilizer for the nitrocellulose, a stabilizing amount of a dihydrazide of an aliphatic dicarboxylic acid, whereby the deleterious effect of the nitrocellulose film base on the photographic emulsion is materially reduced.

2. A photographic sensitive element according to claim 1, in which the dihydrazide of an aliphatic dicarboxylic acid is in the form of its hydrazone.

3. A photographic sensitive element comprising a photographic emulsion which would normally be deleteriously affected by continued proximity to nitrocellulose film base, and nitrocellulose film base comprising a stabilizing amount of adipic acid dihydrazide as a stabilizer for the nitrocellulose, whereby the deleterious effect of the nitrocellulose film base on the photographic emulsion is materially reduced.

4. A photographic sensitive element comprising a photographic emulsion which would normally be deleteriously affected by continued proximity to nitrocellulose film base comprising a stabilizing amount of succinic acid dihydrazide as a stabilizer for the nitrocellulose, whereby the deleterious effect of the nitrocellulose film base on the photographic emulsion is materially reduced.

5. A photographic sensitive element comprising a photographic emulsion which would normally be deleteriously affected by continued proximity to nitrocellulose film base, and nitrocellulose film base comprising a stabilizing amount of oxalic acid dihydrazide as a stabilizer for the nitrocellulose, whereby the deleterious effect of the nitrocellulose film base on the photographic emulsion is materially reduced.

6. A photographic sensitive element comprising a photographic emulsion which would normally be deleteriously affected by continued proximity to nitrocellulose film base, and nitrocellulose film base comprising, as a stabilizer for the nitrocellulose, from 0.0001 mole to 0.01 mole, approximately, per 100 grams of nitrocellulose, of a dihydrazide of an aliphatic dicarboxylic acid, whereby the deleterious effect of the nitrocellulose film base on the photogrphic emulsion is materially reduced.

7. A photographic sensitive element comprising a photographic emulsion which would normally be deleteriously affected by continued proximity to nitrocellulose film base, and nitrocellulose film base comprising, as a stabilizer for the nitrocellulose, from 0.02% to 2%, approximately, calculated on the weight of the nitrocellulose, of adipic acid dihydrazide, whereby the deleterious effect of the nitrocellulse film base on the photographic emulsion is materially reduced.

8. A photographic sensitive element comprising a photographic sensitive emulsion which would normally be deleteriously affected by continued proximity to nitrocellulose film base, and nitrocellulose film base comprising, as a stabilizer for the nitrocellulose, from 0.015% to 1.5% approximately, calculated on the weight of the nitrocellulose, of succinic acid dihydrazide, whereby the deleterious effect of the nitrocellulose film base on the photographic emulsion is materially reduced.

9. A photographic sensitive element comprising a photographic emulsion which would normally be deleteriously affected by continued proximity to nitrocellulose film base, and nitrocellulose film base comprising, as a stabilizer for the nitrocellulose, from 0.01% to 1.0%, approximately, calculated on the weight of the nitrocellulose, of oxalic acid dihydrazide, whereby the deleterious effect of the nitrocellulose film base on the photographic emulsion is materially reduced.

10. A nitrocellulose composition comprising, as a stabilizer for the nitrocellulose, a stabilizing amount of a dihydrazide of an aliphatic dicarboxylic acid.

11. A nitrocellulose composition comprising, as a stabilizer for the nitrocellulose, from 0.0001 mole to 0.01 mole, approximately, per 100 grams of nitrocellulose, of a dihydrazide of an aliphatic dicarboxylic acid.

12. A nitrocellulose composition comprising, as a stabilizer for the nitrocellulose, a stabilizing amount of a dihydrazide of an aliphatic dicarboxylic acid, and, as a corrosion inhibitor, a corrosion-inhibiting amount of urea.

13. A nitrocellulose composition comprising, as a stabilizer for the nitrocellulose, from 0.0001 mole to 0.01 mole, approximately, per 100 grams of nitrocellulose, of a dihydrazide of an aliphatic dicarboxylic acid, and, as a corrosion inhibitor, from 0.1% to 1.0% of urea, calculated on the weight of the nitrocellulose.

DONALD R. SWAN.
JOHN M. CALHOUN.